United States Patent
Lin

(10) Patent No.: US 7,876,691 B2
(45) Date of Patent: Jan. 25, 2011

(54) TESTING METHOD FOR NETWORK DEVICE

(75) Inventor: Jiunn-Chen Lin, Hsinchu County (TW)

(73) Assignee: Arcadyan Technology Corporation, Hsinchu (TW)

( * ) Notice: Subject to any disclaimer, the term of this patent is extended or adjusted under 35 U.S.C. 154(b) by 465 days.

(21) Appl. No.: 11/889,953

(22) Filed: Aug. 17, 2007

(65) Prior Publication Data

US 2009/0016227 A1   Jan. 15, 2009

(30) Foreign Application Priority Data

Jul. 9, 2007   (TW) .............................. 96124882 A

(51) Int. Cl.
*H04L 1/00* (2006.01)
(52) U.S. Cl. .................. 370/241; 370/242; 370/248
(58) Field of Classification Search .................. 370/230, 370/241–253, 218, 239, 392; 709/230
See application file for complete search history.

(56) References Cited

U.S. PATENT DOCUMENTS

| | | | |
|---|---|---|---|
| 6,392,990 B1 * | 5/2002 | Tosey et al. .................. 370/218 |
| 7,117,411 B2 * | 10/2006 | McNeely et al. ............. 714/724 |
| 7,519,954 B1 * | 4/2009 | Beddoe et al. .............. 717/124 |
| 2007/0171836 A1 * | 7/2007 | Yoshimi et al. ............. 370/250 |
| 2007/0192501 A1 * | 8/2007 | Kompella .................... 709/230 |
| 2007/0195774 A1 * | 8/2007 | Sherman et al. ............. 370/392 |

* cited by examiner

*Primary Examiner*—William Trost, IV
*Assistant Examiner*—Emmanuel Maglo
(74) *Attorney, Agent, or Firm*—Birch, Stewart, Kolasch & Birch, LLP

(57) ABSTRACT

A testing method for a network device includes the steps of communicating with the network device through a network protocol by a testing host; and transmitting at least one first network protocol packet to the network device so as to enable a command line interface (CLI) of the network device through a first testing command by the testing host.

11 Claims, 2 Drawing Sheets

TESTING METHOD FOR NETWORK DEVICE

BACKGROUND OF THE INVENTION

1. Field of Invention

The invention relates to a testing method and, in particular, to a testing method for a network device.

2. Related Art

With the rapid development in network technology, people can share and transmit a huge amount of multimedia information through network devices, such as access points, gateways, and routers.

Generally speaking, either before a network device is shipped out or sent back for maintenance, it is usually provided with a testing port, such as the serial port, universal asynchronous receiver transmitter (UART), or RS232 for testing the operations thereof. For example, the manufacturer uses an RS232 line to electrically connect a testing host and the testing port of a network device. The testing host then communicates with the network device through the RS232 line, checking the operations thereof in order to find out its performance or problem. The information is used for subsequent debugging.

Since the network device is provided with the testing port, other manufacturers can readily obtain the internal settings thereof through the port. Thus, the design of the network device may be pirated because of this insecurity.

Therefore, it is an important subject to provide a testing method that can test a network device without using a testing port.

SUMMARY OF THE INVENTION

In view of the foregoing, the invention is to provide a testing method for a network device that does not require a testing port.

To achieve the above, the invention discloses a testing method for a network device. the testing method is applied to at least one network device and a testing host, and includes the steps of: communicating with the network device through a network protocol by the testing host, and transmitting at least one first network protocol packet to the network device so as to enable a command line interface (CLI) of the network device through a first testing command by the testing host.

As mentioned above, the testing method for a network device of the invention uses a testing host to send a first network protocol packet to the network device so as to enable the CLI thereof through a first testing command. This allows the testing host to perform reading, writing, controlling, diagnosing, or debugging on the internal settings of the network device. Therefore, the network device does not need to have the conventional testing port. This can avoid the design of the network device from being pirated through the testing port and, thus, increase the security of the network device.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
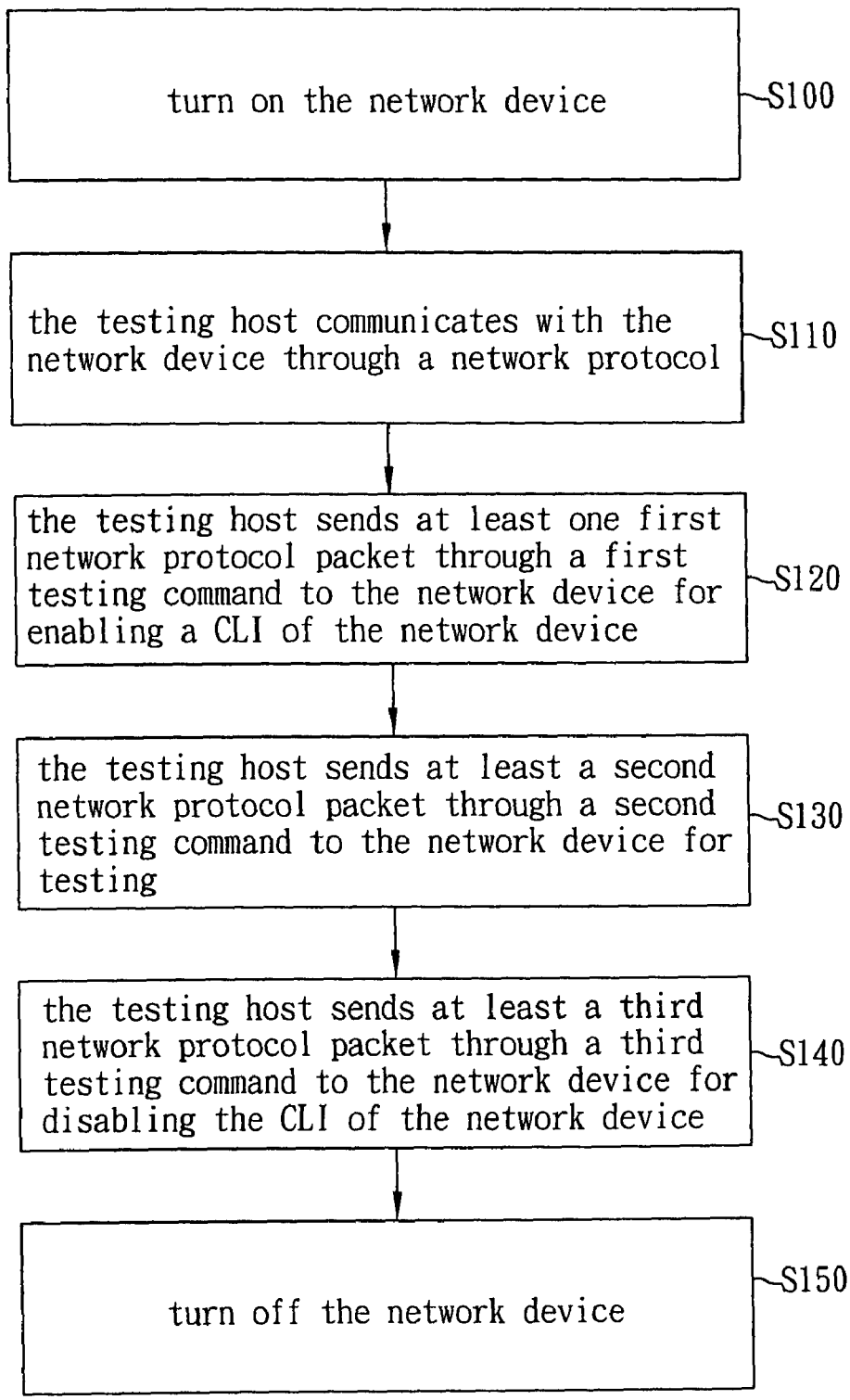
FIG. 1 is a flowchart of a testing method for a network device according to a preferred embodiment of the invention.

With reference to FIG. 1, a testing method for a network device according to a preferred embodiment of the invention is applied to at least one network device and a testing host. In this embodiment, the network device is a wireless network device. The testing method includes the following steps S100 to S150.

In step S100, the network device is turned on, so that the network device can communicate with the environment. In step S110, the testing host communicates with the network device through a network protocol. For example, the network device is provided with a default address, or the network device randomly generates a network address after it is powered on. Afterwards, the testing host can communicate with the network device through network packets according to the network address of the network device.

In step S120, the testing host sends at least one first network protocol packet through a first testing command to the network device for enabling a command line interface (CLI) of the network device.

In this embodiment, the network protocol can be, for example but not limited to, an Internet Control Message Protocol (ICMP). The first testing command can be a packet Internet groper (PING). The first network protocol packet can be an ICMP packet. In particular, the first network protocol packet has a first ICMP header and a first ICMP data. The first ICMP data defines enable information. For example, the testing host can execute the following command to enable the CLI:

ping (network address of the network device)-p (enable information)

Figure 2:
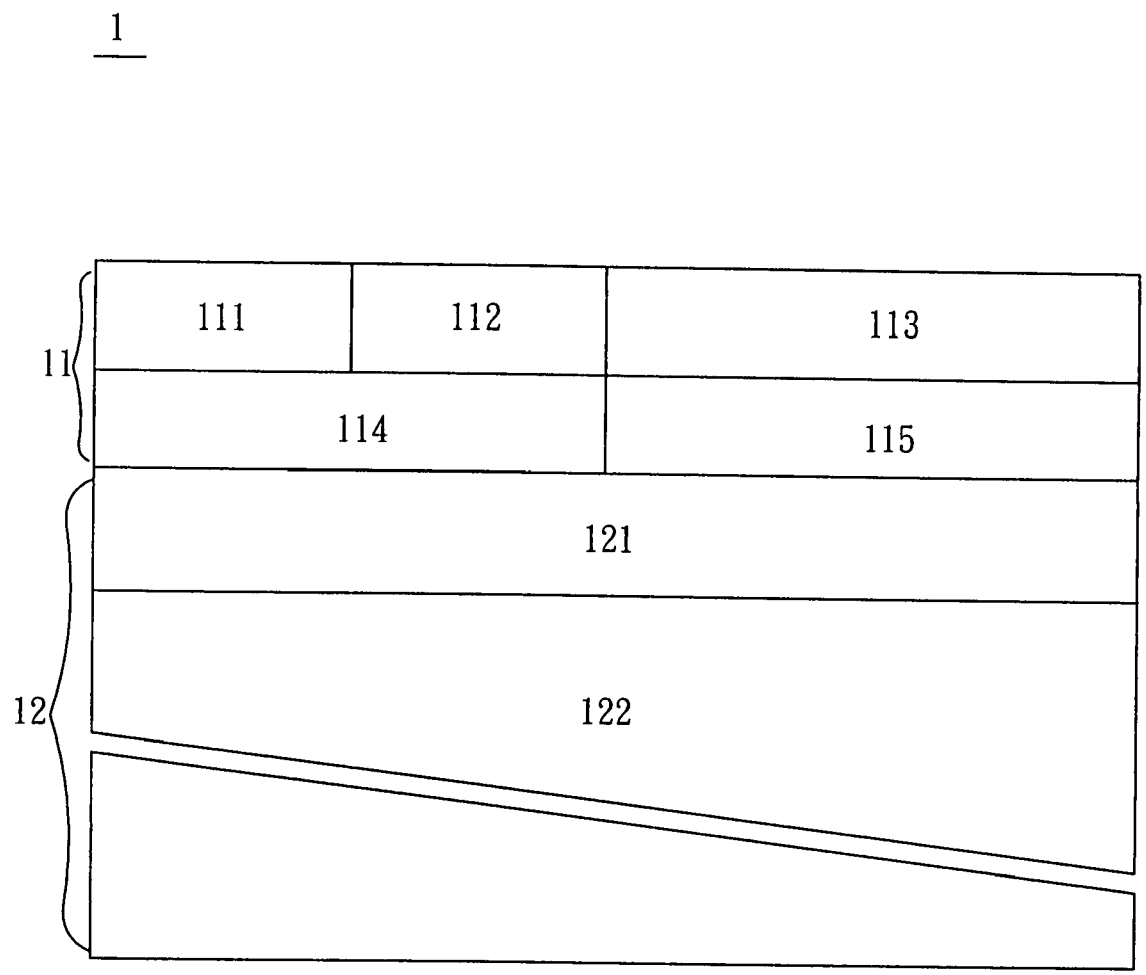
FIG. 2 is a schematic view of the format of a first network protocol packet used in the testing method for a network device according to the embodiment of the invention.

Please refer to FIG. 2. A first network protocol packet 1 defines a first ICMP header 11 and a first ICMP data 12. The first ICMP header 11 has a type field 111, a code field 112, a checksum field 113, an identifier field 114, and a sequence number field 115. The first ICMP data 12 contains an enable information field 121 and other information fields 122. The enable information field 121 defines the enable information that can have different contents according to practical needs. Therefore, since other manufacturers cannot obtain the contents of the enable information, they cannot enable the CLI of the network device using the correct enable information.

With reference to FIG. 1 again, step S130 is executed after the CLI of the network device is enabled.

In step S130, the testing host sends at least a second network protocol packet through a second testing command to the network device for testing. The test referred here may include reading, writing, controlling, diagnosing, or debugging the internal settings of the network device. In this embodiment, the second testing command is an Internet packet testing command, and the second network protocol packet is an ICMP packet. The second network protocol packet includes at least a second ICMP header and a second ICMP data. The second ICMP data defines testing information. Per manufacturer's needs, the testing information may be data reading, writing, controlling, diagnosing, or debugging.

Step S140 follows step S130. In step S140, the testing host sends at least a third network protocol packet through a third testing command to the network device for disabling the CLI of the network device. In this embodiment, the third testing command is an Internet packet testing command. The third network protocol packet is an ICMP packet. In particular, the third network protocol packet includes at least a third ICMP header and a third ICMP data. The third ICMP data defines disable information. The disable information can be designed according to manufacturer's practical needs. After finishing the step S140, step S150 is executed to turn off the network device. This completes the procedure of the testing method for a network device of the invention.

In summary, the testing method for a network device of the invention uses a testing host to send a first network protocol packet to the network device so as to enable the CLI thereof through a first testing command. This allows the testing host to perform reading, writing, controlling, diagnosing, or debugging on the internal settings of the network device. Therefore, the network device does not need to have the conventional testing port. This can avoid the design of the network device from being pirated through the testing port and, thus, increase the security of the network device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A testing method for internal settings of network device applied to at least one network device and a testing host, the method comprising the steps of:
   communicating with the network device through a network protocol by the testing host; and
   transmitting at least one first network protocol packet to the network device so as to enable a command line interface (CLI) of the network device through a first testing command by the testing host;
   transmitting at least a second network protocol packet to the network device through a second testing command by the testing host so as to test the network device, wherein the testing host performs reading, writing, controlling, diagnosing, or debugging the internal settings of the network device; and
   transmitting at least a third network protocol packet to the network device through a third testing command by the testing host so as to disable the CLI of the network device.

2. The testing method according to claim 1 further comprising, before the step of communicating with the network device, the step of:
   turning on the network device.

3. The testing method according to claim 1, wherein the network protocol is an Internet Control Message Protocol (ICMP).

4. The testing method according to claim 3, wherein the first testing command is an ICMP command and the first network protocol packet is an ICMP packet.

5. The testing method according to claim 4, wherein the first network protocol packet at least comprises a first ICMP header and a first ICMP data defining enable information.

6. The testing method according to claim 1, wherein the second testing command is an ICMP command and the second network protocol packet is an ICMP packet.

7. The testing method according to claim 6, wherein the second network protocol packet at least comprises a second ICMP header and a second ICMP data defining testing information.

8. The testing method according to claim 7, wherein the testing information comprises the data reading or the data debugging, and the testing host performs data reading or data debugging on the network device according to the testing information.

9. The testing method according to claim 1, wherein the third testing command is an ICMP command and the third network protocol packet is an ICMP packet.

10. The testing method according to claim 9, wherein the third network protocol packet at least comprises a third ICMP header and a third ICMP data defining disabling information.

11. The testing method according to claim 1, further comprising, after the step of transmitting the third network protocol packet to the network device through the third testing command by the testing host so as to disable the CLI of the network device, the step of:
    turning off the network device.

* * * * *